2,950,202
Patented Aug. 23, 1960

2,950,202
MEAT SPOILAGE INDICATOR

Maxwell C. Brockmann, Indianapolis, Ind., assignor to Hygrade Food Products Corporation, Detroit, Mich., a corporation of New York No Drawing. Filed July 29, 1958, Ser. No. 751,628
7 Claims. (Cl. 99—192)

This invention relates to a novel indicator and, more particularly, it is concerned with an indicator for designating the time that meat has been kept under conditions conducive to spoilage.

Storage of meats takes place under refrigerated conditions to prevent microbial spoilage from occurring. However, it frequently happens that meat products in the course of handling are subjected to elevated temperatures at which rapid growth of food spoiling microorganisms takes place. Casual inspection of the food product is not sufficient to detect the extent of spoilage during the inductive phase, and for this reason products may appear sound to within an hour of the time that frank spoilage is manifest. It is apparent from the handling of meat products that there is lacking a simple inexpensive way of designating when the particular food item has been subjected to adverse conditions for an undue period. Prior art workers have been investigating this problem for some time but thus far no one has suggested a simple solution. Following extensive investigation, it was found that a simple and economic solution to the problem does exist.

Accordingly, it is an object of this invention to describe an indicator which is activated by relationships of time and temperature which are in all respects similar to those conducive to microbial spoilage. The indicator can be regarded as self-integrating with respect to time and temperature. Response to time and temperature follows the same pattern as the organisms responsible for microbial spoilage.

Other objects and advantages of this invention will become apparent from the following description and explanation thereof.

The microbial spoilage indicator of this invention comprises a population of viable microorganisms, which grow in approximately the same temperature range as microorganisms associated with spoilage, a nutrient or growth medium which may contain a buffer, and an indicator which will show when the microbial population has passed a predetermined point. In the active indicator all of the named components are in a common aqueous system. While it is possible to maintain the system frozen up to the time of use, it is more feasible to maintain the water apart from the microorganisms and nutrient until the time of use. In the practice of this invention the microorganisms, nutrient, indicator, and water are maintained separate and apart or out of contact with the meat product to avoid problems of contamination. For this purpose these materials are kept within a separate package which may take the form of a transparent plastic bag. The structural features of the package will be described in greater detail below.

The microbial species employed is preferably one which is not capable of inducing food poisoning, i.e. it is non-pathogenic. Even though the microorganism will not be in contact with the meat product, it is advisable to use a non-pathogenic microorganism because of the possibility, through mischance, that such an organism will contaminate the food product. The type of organism which can be used for this invention may vary considerably and include a large number of classes. The important feature in the selection of a microorganism is that it must be capable of growth over the temperature range conducive to spoilage. In this regard the microorganism may be any acid producing bacteria which undergoes rapid growth over a temperature range of about 45 to about 100° F. when in contact with a suitable growth medium or nutrient. As a result of growth, the acid developed increases in concentration to the point that it will affect an acid-base indicator and cause a color change therein. The change in the color of the indicator will serve to alert the handler of the meat product that the danger of frank spoilage is imminent. A microorganism which can be used in this instance is the homofermentative lactic acid bacteria such as, for example, *Lactobacillus lactis, Lactobacillus helveticus, Lactobacillus acidophilus, Lactobacillus bifidus, Lactobacillus bulgaricus, Lactobacillus casei, Lactobacillus plantarum*, and others. The microorganism can also be a mold with colored spores or one which undergoes extensive mycelial growth. Bacteria or yeast growth will cause turbidity, and an intensity scale calibrated to show the appropriate turbidity at excessive growth can be used as an indicator.

In general, the quantity of microorganism relative to the nutrient can vary over a wide range. In each specific case the population of microorganisms per unit of nutrient is predetermined to produce a change within a temperature range which is expected to be experienced under actual service conditions. In the case of the homofermentative bacteria, it is convenient to use 500 to 20,000 viable cells per 1 ml. of dissolved medium.

The nutrient to be used is selected on the basis of being one which will promote growth of microorganisms within the temperature range to be experienced in the course of handling the meat product. The growth medium must provide a nitrogen source such as, for example, the peptones which are the partially hydrolyzed natural proteins, e.g. bacto-peptone. Other examples of nitrogen supplying growth medium are bacto-tryptone, proteose peptone, bacto-tryptose, neopeptone, bacto-casitone, bacto-protone, and bacto-casamino acids. Various other amino acids can also be used. The growth medium must also include a carbon source for the microorganisms. The carbon containing or supplying material can include the monosaccharides, such as glucose, levulose, mannose or galactose; disaccharides, such as sucrose, lactose or maltose; the polysaccharides, including starch, inulin, dextrin, glycogen, etc.; the alcohols, including glycerol, adonitol, mannitol, dulcitol, sorbitol, etc.; the glucosides, including salacin, amygdalin, etc.; the noncarbohydrate compounds, including inositol, etc. The quantity of growth medium which is present with the microorganism is calculated to produce a rapid growth within the specified temperature range so that the change affected by reference to the indicator will serve as a designation to the handler of the product that the food product has undergone a more than safe limit of subjection to elevated temperature. It should be borne in mind that the quantity of nutrient is correlated with the population of microorganism and the type of indicator to be used.

The indicator is selected on the basis of the type of microorganism and nutrient which are used in the system. Where the microorganism is an acid producing bacteria, an acid-base indicator is employed. In this connection the indicator is, for example, bromophenol blue, bromochlorophenol blue, bromocresol green, chlorocresol green, methyl red, chlorophenol red, bromophenol red, bromocresol purple, bromothymol blue and phenol red. The indicator must not exert a significant inhibitory effect on the activity of the microbial culture. It will be noted from the type of indicators enumerated above that the color change will take place at various pH levels. This means that the indicator must be correlated with the type of microorganism used and the nutrient to be supplied therefor. When yeast is used as the microorganism, the indicator is a turbidity scale which shows the extent of colony growth representing the point at which the temperature history of the food product has been undesirable from the standpoint of spoilage.

The indicator system of this invention is preferably maintained in the anhydrous state until the start of the period it is to monitor. Generally the indicator system is not activated until the meat is packaged or removed from inventory. The indicator system is activated by bringing all components (microorganism, nutrient and indicator) into a common aqueous solution. In order to assure uniformity of activity it is desirable to utilize lyophilized or freeze dried cultures. The growth medium or utrient is likewise maintained in a dried state. In this way the indicator can be put into operation at the convenience of the handler in order that he can control zero time in respect to the history of the meat product. The indicator system is placed in a suitable package. The package can be a sealed envelope divided into two compartments which are separated by a rupturable membrane. The material making up the package is either translucent or transparent so that the color change can be witnessed without difficulty. Various plastic materials lend themselves to use for this purpose such as, for example, polyethylene, Mylar, Kel–F, Teflon, Lucite, etc. In any case, the bag or package is preferably flexible so that the separated membrane can be easily ruptured by the operator and put the indicator into operation. As might be expected, the package or envelope is waterproof so that the only source of water is that contained within the separate compartment of the package.

In order to better understand the present invention, reference will be had to specific examples. The following are specific illustrations of compositions which can be used for the purpose of this invention:

*Example I*

| Percentage | Name of Material |
|---|---|
| 1% | Lyophilized *Pediococcus cerevisiae*. |
| 1% | Peptone. |
| 1% | Yeast extract. |
| 1% | Dextrose. |
| .01% | Bromocresol purple. |
| Balance | Water. |

*Example II*

| Percentage | Name of Material |
|---|---|
| 1% | Lyophilized *Pediococcus cerevisiae*. |
| 1% | Tryptone. |
| 0.5% | Dextrose. |
| .004% | Bromocresol purple. |
| Balance | Water. |

*Example III*

| Percentage | Name of Material |
|---|---|
| 0.25% | Lyophilized *Pediococcus cerevisiae*. |
| 0.5% | Yeast extract. |
| 1.5% | Dextrose. |
| 0.25% | Potassium monohydrogen phosphate. |
| 0.002% | Bromothymol blue. |
| Balance | Water. |

*Example IV*

| Percentage | Name of Material |
|---|---|
| 0.50% | Active dry yeast. |
| 0.4% | Yeast extract. |
| 0.1% | $KH_2PO_4$. |
| 1.0% | Sucrose. |
| 98% | Water. |

(In this case, gas production as manifest by swelling of the package indicates danger of spoilage.)

*Example V*

| Percentage | Name of Material |
|---|---|
| 0.2% | Dry bread inoculated with spores from Penicillium (mold species). |
| 2.0% | Sucrose. |
| 0.2% | Potassium nitrate. |
| 0.1% | Potassium monohydrogen phosphate. |
| 0.1% | Magnesium sulfate. |
| 0.1% | Sodium chloride. |
| 0.01% | Ferrous sulfate. |
| Balance | Water. |

(At the danger point, this indicator becomes a green mat of mold.)

Having thus provided a description of my invention along with specific examples thereof, it should be understood that no undue restrictions or limitations are to be imposed by reason thereof but that the present invention is defined by the appended claims.

I claim:

1. A temperature indicator comprising a package containing two separate compartments, one compartment containing a lyophilized microorganism capable of accelerated growth with increasing temperature, a dried nutrient for the microorganism and an indicator for showing that the growth of microorganism is greater than a desired limit, the second compartment containing water and the two compartments being separated by a membrane which is capable of being broken manually.

2. A temperature indicator comprising a package containing two compartments which are separated by a rupturable membrane capable of being broken manually, one compartment containing a lyophilized acid producing microorganism, a dried nutrient for the organism and an acid-base indicator for showing that the growth of microorganism is greater than the desired limit, and the other compartment contains water.

3. The temperature indicator of claim 2 wherein the microorganism is a lactic acid producing bacteria.

4. A temperature indicator comprising a package containing two separate compartments, one compartment containing a microorganism capable of accelerated growth with increasing temperature, a dried nutrient for the microorganism and an indicator for showing that the growth of microorganism is greater than a desired limit, the second compartment containing water and the two compartments being separated by a membrane which is capable of being broken manually.

5. A temperature indicator comprising a package containing two separate compartments, one compartment containing an acid producing microorganism capable of accelerated growth with increasing temperature, a dried nutrient for the microorganism and an acid base indicator for showing that the growth of microorganism is greater than a desired limit, the second compartment containing water and the two compartments being separated by a membrane which is capable of being broken manually.

6. A temperature indicator comprising a package containing two separate compartments, a first compartment containing a lyophilized culture of *Pediococcus cerevisiae* capable of accelerated growth with increasing temperature, a growth medium consisting of peptone, yeast extract and dextrose and an indicator selected from the group consisting of bromocresol purple and chlorophenol red for showing that the growth of lyophilized culture is greater than a desired limit, the contents of said first compartment being essentially anhydrous, the second compartment containing water and the two compartments being separated by a membrane which is capable of being broken manually.

7. A meat spoilage indicator comprising a package containing two separate compartments, a first compartment containing a predetermined amount of an organism capable of accelerated growth with increasing temperature, a correlated amount of nutrient for said organism to bring about accelerated growth of said organism at temperatures of meat spoilage, and an indicator for designating visually the condition of said accelerated growth, the contents of said first compartment being essentially anhydrous, the second compartment containing water and the two compartments being separated by a membrane which is capable of being broken manually.

References Cited in the file of this patent
UNITED STATES PATENTS 2,485,566     Clark _____ Oct. 25, 1949